Patented May 1, 1923.

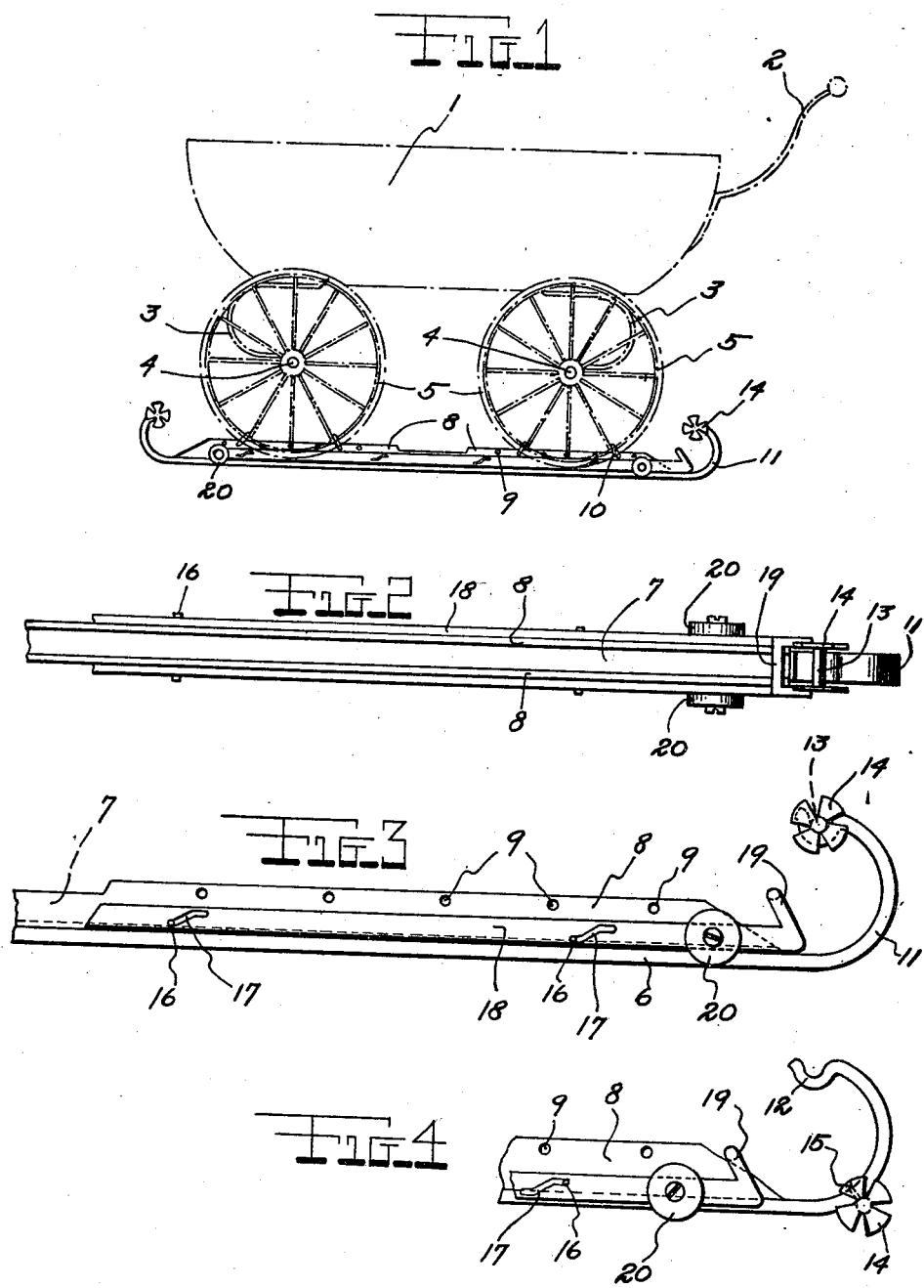

1,453,722

UNITED STATES PATENT OFFICE.

OTTO NUOFFER, OF NEW YORK, N. Y.

SLED ATTACHMENT FOR CARRIAGES AND THE LIKE.

Application filed July 8, 1922. Serial No. 573,698.

*To all whom it may concern:*

Be it known that I, OTTO NUOFFER, a citizen of the United States, residing at New York, in the county of New York and State of New York, have invented certain new and useful Improvements in Sled Attachments for Carriages and the like, of which the following is a specification.

This invention relates to sled runners and the main object is to provide runners particularly adaptable for use on small vehicles such as baby carriages, whereby the vehicle can be converted from a wheeled type to a sled runner type. This means is particularly applicable in climates where frequent snowfalls occur.

Another object is to provide means associated with and mounted on the runners which effectually prevent the vehicle, to which the said runners are attached, from inadvertently starting from rest.

These and other objects will become apparent in the description below, in which characters of reference refer to like-named parts in the drawing.

Referring briefly to the drawing, Figure 1 is a side elevational view of the runners as applied to a perambulator.

Figure 2 is a top plan view of a portion of the sled runner.

Figure 3 is an enlarged side elevational view of the runner when in position for coasting.

Figure 4 is a fragmentary side elevational view of the sled runner when the same is to be used on a non-coasting surface.

Describing the drawing in detail, the numeral 1 indicates the body of a perambulator which has the conventional type of handle 2 secured thereto. U-shaped springs 3 have axles 4 rigid therewith and have the wheels 5 rotatably mounted thereon.

The runner comprises a relatively long coasting bar 6 having channelled brackets 7 secured thereto. The side walls 8 of said brackets have a plurality of equally spaced holes 9 which receive loop rings 10, the latter providing a means for securing the wheel rims within the channelled brackets 7.

The ends 11 of the coasting bars 7 are formed into upwardly curved portions and are provided with cradle loops 12. Star wheels 14 connected to each other by a shaft 13 are supported in said cradle loop when not being used and are prevented from being detached from the coasting bar 7 by a wire yoke 15, the latter being formed rigid with the shaft 13.

Pins 16 protruding from the side walls 8 of the channelled member 7 are engaged in the inclined slots 17 of the rectangular rods 18. Said rods are mounted parallel to each other on the exterior surfaces of the side walls 8, and are joined at one end by a foot pedal 19.

Small traction disks 20 are rotatably mounted on the sides of said rods 18 at the forward and rear ends thereof, the disks being mounted so that the lower peripheries thereof extend below the bottom edges of said rods.

In using the device, the perambulator is lifted upon the runners, the rims of the wheels 5 resting in the channel between the side walls 8. The said wheels are secured in place on said channelled bracket by looping the rings thru the nearest hole 9 and the rim of the wheel.

When smooth surfaces are encountered the coasting bars 7 are used. In localities where wheeled as well as coasting traction is required, the rods 18 carrying the disk 20 are urged forward by pressure on the foot pedal 19. In so doing the rods 18 will be urged downwardly by pins 16 which are engaged in the inclined slots 17. As the rods are lowered the entire runner is lifted so that the vehicle is supported on the disks 20.

The star wheels 14 are used as a form of brake and are manipulated by sliding the same out of the cradle 12 and around the curved portion 11 until the peripheries of said star wheels contact with the round surface. Figure 4 illustrates the star wheels in position as a brake.

I claim;

1. A sled runner for a wheeled vehicle comprising a coasting bar adapted to extend the length of the wheel base and support said vehicle, a channelled member secured to the coasting bar and adapted to receive the wheels of said vehicle, and means for preventing the vehicle from starting from a position of rest.

2. A sled runner for a wheeled vehicle comprising a coasting bar adapted to extend the length of the wheel base of a vehicle, a channelled member secured to said bar and provided with a series of spaced holes, rings in said holes securing the vehicle to the runner, star wheels cradled at the ends of the bars above the traction surface, said star wheels adapted to prevent the coasting bars from starting from a position of rest when in contact with the ground, and means for lifting the coasting bars clear of the traction surface.

3. A sled runner for a wheeled vehicle comprising a coasting bar adapted to extend the length of the wheel base of a vehicle, a channelled member secured to said bar and adapted to receive the wheels of said vehicle, rods having inclined slots therein secured to the sides of said channelled member, pins projecting from the latter adapted to engage said slots, a foot pedal joining the rear ends of said rods and adapted to lower the rods beneath the surface of the coasting bars, means for securing the sled runner to a vehicle and means for rolling the sled runner when the said bars are lowered.

In witness whereof I affix my signature.

OTTO NUOFFER.